No. 863,027.
PATENTED AUG. 13, 1907.
W. W. GORDON.
PIPE COUPLING.
APPLICATION FILED FEB. 10, 1906.
2 SHEETS—SHEET 1.
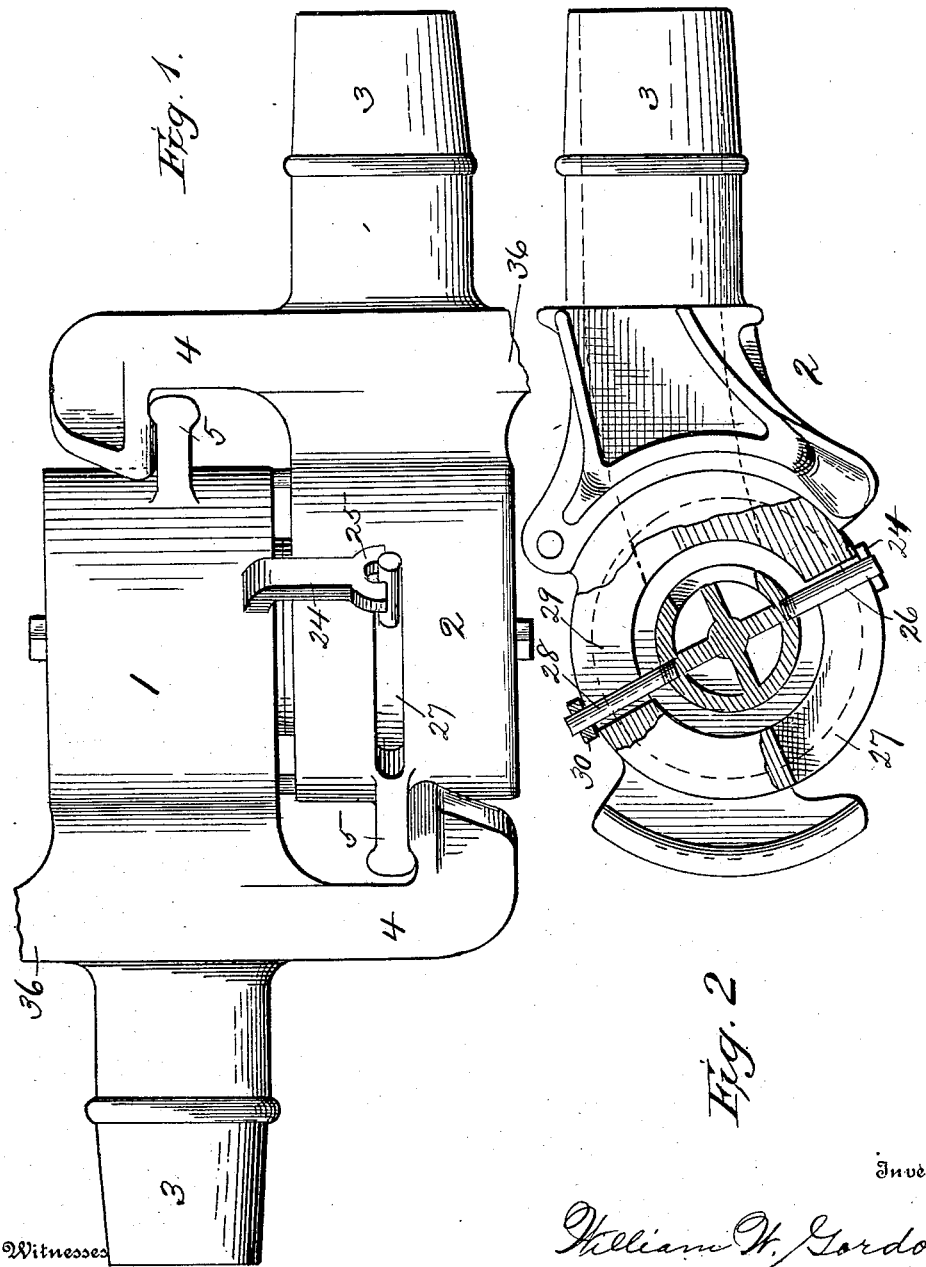

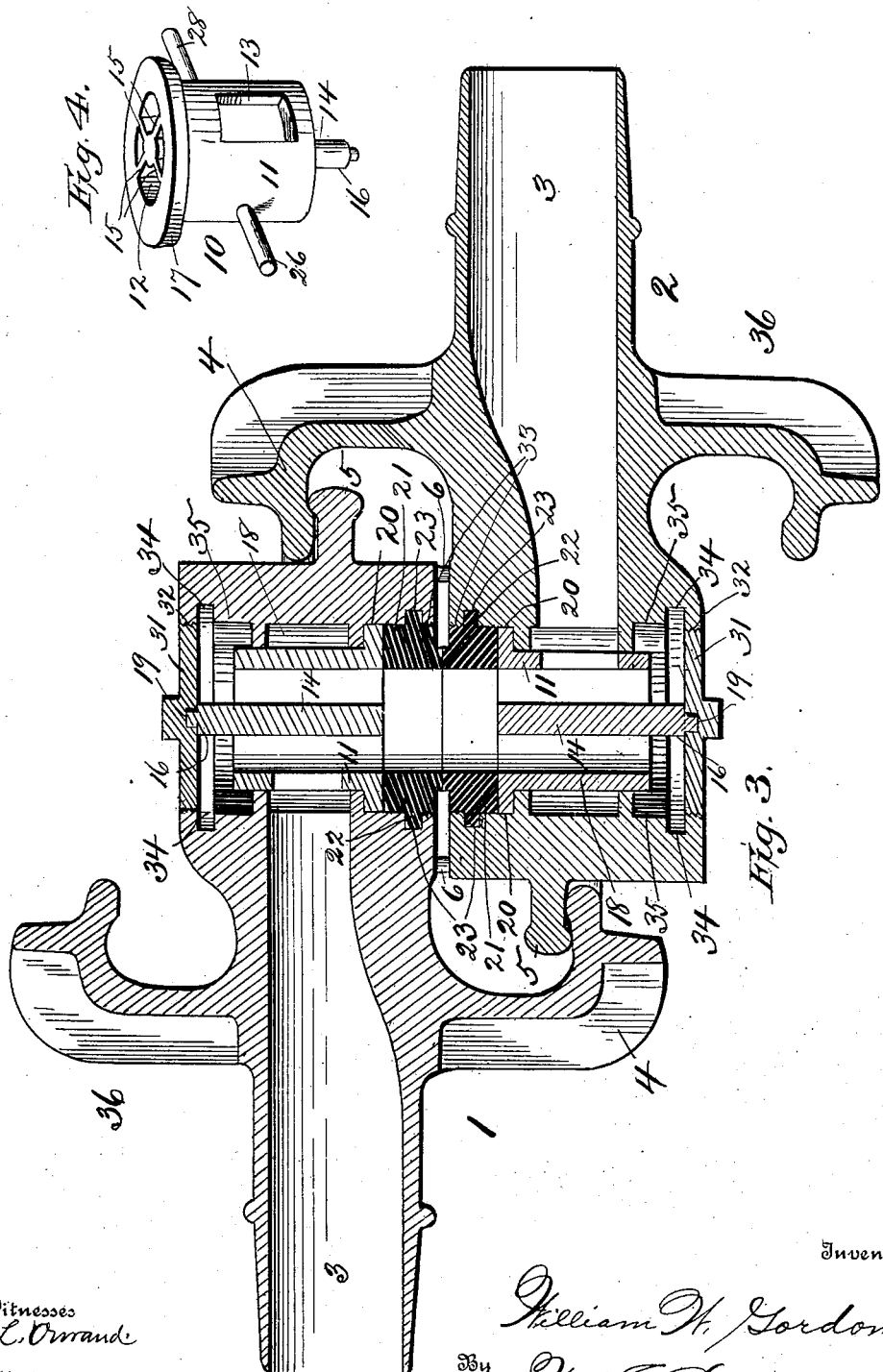

UNITED STATES PATENT OFFICE.

WILLIAM W. GORDON, OF WASHINGTON, DISTRICT OF COLUMBIA.

PIPE-COUPLING.

No. 863,027.  Specification of Letters Patent.  Patented Aug. 13, 1907.

Application filed February 10, 1906. Serial No. 300,369.

*To all whom it may concern:*

Be it known that I, WILLIAM W. GORDON, a citizen of the United States, residing at Washington, in the District of Columbia, have invented certain new and useful Improvements in Pipe-Couplings, of which the following is a specification.

My invention relates to hose or pipe couplings and particularly to couplings for connecting together sections of hose used in railway air brake systems and among the objects in view is to provide a coupling of the character described which during the act of connecting the sections thereof together will also automatically open communication through the brake pipe to allow the compressed air to flow therethrough from one car to another. Thus the coupling of the sections together and the opening of the communication through the brake pipe from one car to another are effected by one and the same operation thereby rendering it unnecessary for the person coupling the hose sections to make separate and distinct movements or operations to couple the coupling sections and to open valves or cocks in the brake pipe.

A further object of my invention, is to dispense with the use of the two cocks which are at present generally used on air brake pipes and located one at each end of a car and which must be turned by hand to permit flow of compressed air through the brake pipe.

A further object of my invention, is to provide a device of the character described which shall be extremely simple in construction and efficient in its operation.

A still further object is to provide a coupling which may be coupled up with the usual air signaling pipe of a train in case of a break or rupture in the regular brake pipe and thus reëstablish proper working condition of the brake system for all cars of the train with the exception of the one on which the break has occurred.

With the various objects in view the invention consists in the novel construction, arrangement and combination of parts as hereinafter fully described, illustrated in the drawings and pointed out in the appended claim.

In the drawings:—Figure 1 is a plan view of my improved coupling, showing the parts thereof coupled together. Fig. 2 is a plan view with parts broken away and in section. Fig 3 is a vertical sectional view, showing the parts of the coupling connected together. Fig. 4 is a detail perspective view of one of the valves.

In most air brake systems as at present constructed and applied to railway cars, couplings are provided for connecting together the various sections of the compressed air brake pipes which extend along beneath the cars, said couplings being of any usual or preferred construction but preferably one in which the parts will be coupled together by substantially a quarter turn of one part relatively to the other.

In order that the compressed air necessary to the operation of the system may be permitted to flow through the coupled up sections of pipe, cocks or valves have been provided, one at each end of a car, and located in the line of pipe, which cocks or valves have to be opened by hand after the coupling up of the sections of pipe. Thus in those systems embodying the above described construction three separate and distinct manual operations are necessary for each car, one to couple the sections of pipe together, and one to open each cock or valve. Thus it often happens that the employee will, after coupling up the sections of pipe, omit to open one or the other or both of the cocks or valves, so that compressed air will not be supplied to that part of the train beyond the point where the cock or valve has not been opened, and as the engineer has no means of knowing of the stated fact serious accidents might result owing to the impossibility of applying the brakes of those cars which have not been supplied with compressed air. Furthermore it has sometimes happened that mischievous persons have closed one or more of the cocks or valves in the brake pipe thereby cutting off the supply of compressed air to certain of the cars. All of the above and other well known disadvantages are avoided by the coupling device forming the subject matter of my present invention and which I will now proceed to describe in detail.

My improved coupling comprises two members or sections 1, 2, which in their general construction are similar to the coupling sections at present used in the standard equipment of railway cars; that is to say, said sections are each provided with an extension 3 at one end over which the end of the usual brake pipe section is adapted to be slipped, and also provided each with lugs 4 and 5, the lugs 4 and 5 of one section being adapted to interlock respectively with the lugs 5 and 4 of the other section when one section is given about a quarter turn relatively to the other in a well known manner and when the two sections are coupled together the bores thereof are in register so that compressed air can flow through the registering passages of the sections.

6 indicates a pin carried by each coupling member and adapted to abut against the lugs 5 to limit the turning movement of the members.

Suitable elastic washers are provided to make a tight joint at the point where the opposing faces of the coupling sections come together.

As so far described the device is similar to the standard coupling device as now generally used on railway cars.

My improvements involve the employment of a valve arranged preferably in each of the sections of the coupling, which valves are adapted to control the flow of compressed air through the brake pipe, and said valves are adapted to be automatically opened during the coupling of the sections together and to be automatically closed when said sections are uncoupled.

10 indicates the valves which I employ, the same comprising a cylindrical body 11 having a central bore or passage 12 and a passage 13 in its cylindrical wall communicating with the passage 12.

While I have described the valves as being each provided with a passage 12 and a passage 13, communicating with each other, yet in reality these passages constitute, and to all intents and purposes are, the equivalent of but one passage. A stem 14 extends centrally through the body of the valve and is carried by arms 15. One end of the stem projects beyond one face of the valve as shown at 16, and the body is provided with a circumferential flange 17. Each valve is rotatably mounted within the vertical cylindrical portion 18 of the bore of a coupling member, the projecting end of the stem seating within a recess 19 and the flange 17 seating within a recess 20 in the coupling member.

21 indicates a packing ring or washer which is arranged within the portion 18 of the bore of each coupling section, said washer seating against the flange 17 of the valve and projecting slightly beyond the inner face of the coupling section. Any suitable washer may be used but I preferably employ a washer of substantially the shape shown, the same having a circumferential flange 22 intermediate its upper and lower edges, which flange seats within a recess 23 in the coupling member. When the coupling members are coupled the projecting portions of the washers will be pressed tightly against each other and thus form a tight joint to prevent leakage of compressed air.

While I have described a specific form and arrangement of valve adapted to control the flow of air through the brake pipe, yet it will be understood that I do not wish to be restricted to the form and arrangement of valve shown as my invention contemplates broadly the use of any character of valve which is adapted to be operated automatically during the act of coupling together the parts of the coupling and of uncoupling said parts.

For the purpose of automatically operating the valves during the coupling and uncoupling operations I provide suitable means, as for instance an arm or lug 24 projecting from each of the coupling members and forked at the outer end as at 25 so as to embrace a rod 26 which is secured to the valve in any suitable manner as for instance by threading the rod and screwing it into a threaded opening in the valve. The rod 26 extends through a slot 27 provided in the wall of the coupling member and extending about one fourth of the circumference of the head of the member. It will thus be seen that when one of the parts of the coupling is turned so as to effect a coupling with the other part, the arms 24 will rotate the valves about a quarter of a turn or enough to bring the passages 13 in register with the bores of their respective coupling members, thereby establishing communication through the said members for the flow of compressed air. When it is desired to uncouple the coupling members the backward turn of one of them will cause the arms 24 to turn the valves reversely about a quarter turn, thus carrying the passages 13 out of register with the bores of the members and closing the communication between the members.

I preferably provide each of the valves with two arms, the additional arm 28 being arranged diametrically opposite to the arm 26 and projecting through a slot 29 similar to slot 27 provided in the wall of the coupling member. Each coupling member is also provided with an additional lug or arm 30 similar to arm 24 adapted to engage the arm 28. By the provision of two arms on each valve the turning of the valves will be effected more easily and smoothly and any tendency of the valves to bind or wedge in their seats will be prevented.

I have heretofore described the projecting ends of the valve stems as being rotatably mounted in recesses 19 and these latter are preferably formed in plugs 31 which are detachably secured to the coupling members at one end of the vertical portion of the passage therein to thereby effect a closure at that point, and the plugs are threaded circumferentially whereby they may screw within the threaded end of the passage as at 32. I also thread the coupling members at the opposite end of the vertical portions of the passages therein as at 33, the diameter of the threaded openings and the threading thereof being similar so that the plugs may be applied at either end. I also preferably provide each of the coupling members with an annular recess 34 similar in shape to the recess 23, and also with a seat 35 similar to the seat 20, whereby the washer may be changed from one end to the other and also the valve may be reversed in position. I also provide each of the coupling members with an additional lug 36 similar to the lug 4 and arranged diametrically opposite to the latter. The provision of means for adapting the plugs, washers and valves to be reversed in their position and also the provision of the arms 36 are for the purpose of making the coupling sections reversible when desired.

It is my purpose to equip not only the usual brake pipe with my coupling device, but also provide the usual signaling pipe with the same, with the exception that the members applied to the signaling pipe will be devoid of the valves. Thus in the event of a break occurring in the brake pipe of any particular car, I would uncouple the members of the couplings at opposite ends of the car and then couple up one member of each coupling of the brake pipe with one member of each coupling of the signaling pipe, thus cutting out of circuit the car in which the break has occurred. This will permit of the brakes being applied on all of the cars excepting the one where the break occurred and furnishes a temporary repair until the broken section of the brake pipe can be removed and a new one substituted.

It will be obvious that I could dispense with the valve in one of the sections and have only the valve in the other section control the communication through both coupling sections, but this arrangement is not desirable for the reason that should the sections be uncoupled for any purpose the compressed air would escape through the section not having a valve.

I would state that should a train become separated accidentally the longitudinal pull exerted upon the brake pipe will pull the coupling sections apart without closing the valves and consequently the compressed air will escape, thus applying the brakes to all the cars and stopping their movement.

What I claim and desire to secure by Letters Patent is:—

1. In a pipe coupling of the character described, the combination with two sections or members, each provided with a passage, of a rotatable valve reversibly arranged in one of the sections and adapted to control the flow of fluid through said passages, said valve being operatable by the turning movements of one of the sections for the purposes set forth.

2. In a pipe coupling of the character described, the combination with two sections or members each provided with a passage, and a valve reversibly arranged in each of the sections and adapted to conjointly control the flow of fluid through said passages, said valve being operatable in either position by the turning movements of one of the sections.

3. In a pipe coupling of the character described, the combination with two sections or members each provided with a passage, of a reversibly arranged rotatable valve in each of the sections and adapted to conjointly control the flow of fluid through said passages, said valves being operatable in either position by the turning movements of one of the sections.

4. In a pipe coupling of the character described, the combination with two sections or members each provided with a passage, of a reversibly arranged rotatable valve having a passage adapted to be brought into and out of register with the passages in the said sections to thereby control the flow of fluid through the various passages, said valve being operatable in either position by the turning movements of one of the sections.

5. In a pipe coupling of the character described, the combination with two sections or members each provided with a passage, of a reversibly arranged rotatable valve in each of the sections and each having a passage adapted to be brought into and out of register with the passages in the said sections to thereby control the flow of fluid through the various passages, said valves being operatable in either position by the turning movements of one of the sections.

6. In a pipe coupling of the character described, the combination with two sections or members each provided with a passage, of a valve reversibly arranged in one of the sections, said valve being operatable in either position by the turning movements of one of the sections to control the flow of fluid through the said passages.

7. In a pipe coupling of the character described, a coupling section or member having a passage therein, and a valve reversibly arranged in said section and having a passage, said valve being adapted to be operated in either position to bring its passage into and out of register with the passage in the coupling section.

8. In a pipe coupling of the character described, a coupling section or member, having a passage therein, a valve carried by said coupling section and having a passage adapted to be brought into and out of register with the passage in the said section, said valve being adapted to be reversed in position as described, said coupling section having seatings for a washer and a washer adapted to be arranged in either of said seatings.

9. In a pipe coupling of the character described, the combination with a coupling section or member having a passage therein, of a valve reversibly arranged in said section and having a passage adapted to be brought into and out of register with the passage in the coupling section, said valve having a circumferential flange at one end, an arm carried by said valve and projecting through a slot in the coupling section, and means adapted to engage with said arm in either position of the valve to effect the turning of the valve.

10. In a pipe coupling of the character described, a coupling section having a passage therein, a valve carried by said section and adapted to be reversed in position and having a passage adapted to be brought into and out of register with the passage in said coupling section, and arms carried by said valve and projecting through slots in the coupling section.

11. In a pipe coupling of the character described, a coupling member or section having a passage therein, a valve arranged in said section and adapted to be reversed in position and having a passage adapted to be brought into and out of register with the passage in the coupling section, said section being provided with a threaded opening at each side thereof, and a plug adapted to be screwed into either of said threaded openings.

12. In a pipe coupling of the character described the combination with two sections or members each provided with a passage, of a valve rotatably arranged in one of the sections and comprising a cylindrical body having a central passage and a passage in its circumferential wall communicating with the first passage, a stem extending through the body and projecting beyond one face of the valve, and a circumferential flange on the body, the said projecting end of the stem and the said flange seating in recesses in the coupling member, and the said valve being operatable by the turning movements of one of the sections.

13. In a pipe coupling of the character described the combination with two coupling sections or members each provided with a passage, and a forked arm projecting from each coupling section, of a valve rotatably arranged in each of the said sections, and an arm on each valve extending through a slot in the respective coupling section and embraced by the forked end of the arm on said section.

14. In a pipe coupling of the character described, the combination with two coupling sections or members each provided with a passage, and two forked arms projecting from each coupling section, of a valve rotatably arranged in each of the said sections, and two arms on each valve extending through slots in the respective coupling section and embraced by the forked ends of the arms on the said section, each of said valves being provided with a passage adapted to be brought into and out of register with the passages in the respective coupling sections for the purposes set forth.

In testimony whereof I affix my signature in presence of two witnesses.

WILLIAM W. GORDON.

Witnesses:
H. P. HOWARD, Jr.,
WM. E. BOULTER.